(12) United States Patent
Anthony et al.

(10) Patent No.: US 10,463,192 B2
(45) Date of Patent: Nov. 5, 2019

(54) AUTOMATIC COFFEE MAKER

(71) Applicant: SharkNinja Operating LLC, Newton, MA (US)

(72) Inventors: Joshua Anthony, Billerica, MA (US); Justin Riley, Medway, MA (US); Darwin Keith-Lucas, Arlington, MA (US)

(73) Assignee: SHARKNINJA OPERATING LLC, Needham, MA (US)

( * ) Notice: Subject to any disclaimer, the term of this patent is extended or adjusted under 35 U.S.C. 154(b) by 0 days.

(21) Appl. No.: 16/014,558

(22) Filed: Jun. 21, 2018

(65) Prior Publication Data
US 2018/0296027 A1  Oct. 18, 2018

Related U.S. Application Data

(62) Division of application No. 14/307,289, filed on Jun. 17, 2014, now Pat. No. 10,028,615.

(51) Int. Cl.
*A47J 31/56*  (2006.01)
*A47J 31/00*  (2006.01)
(Continued)

(52) U.S. Cl.
CPC .............. *A47J 31/56* (2013.01); *A23F 5/26* (2013.01); *A23F 5/262* (2013.01); *A47J 31/002* (2013.01); *A47J 31/462* (2013.01)

(58) Field of Classification Search
CPC ........ A47J 31/56; A47J 31/002; A47J 31/462; A23F 5/26; A23F 5/262
See application file for complete search history.

(56) References Cited

U.S. PATENT DOCUMENTS 4,100,394 A    7/1978  Tilp
4,208,957 A *  6/1980  Bollman ............... A47J 31/545
                                                      99/282
(Continued)

FOREIGN PATENT DOCUMENTS

EP    0395907 A1    11/1990
EP    2157894 B1     7/2013
(Continued)

OTHER PUBLICATIONS

"How to Brew Great Coffee: The Pour Over Method"; http://www.thekitchn.com/how-to-brew-great-coffee-the-p-143451; Aug. 18, 2014.
(Continued)

*Primary Examiner* — Anthony J Weier
(74) *Attorney, Agent, or Firm* — Cantor Colburn LLP

(57) ABSTRACT

Included herein are methods and systems for brewing coffee. In one example, a method of brewing coffee includes delivering a predetermined amount of water from a reservoir to a heater, heating the predetermined amount of water with the heater to form heated water, delivering the predetermined amount of the heated water from the heater to a brew basket containing ground coffee, and soaking the ground coffee with the predetermined amount of the heated water for a predetermined period of time to enable the heated water delivered to the brew basket to presoak the ground coffee contained in brew basket prior delivering a remaining amount of water from the quantity of water to the brew basket to complete the brewing cycle.

9 Claims, 2 Drawing Sheets

(51) Int. Cl.
*A47J 31/46* (2006.01)
*A23F 5/26* (2006.01)

(56) References Cited

U.S. PATENT DOCUMENTS

| | | |
|---|---|---|
| 4,468,406 A | 8/1984 | D'alayer De Costemore D'arc |
| 4,484,515 A * | 11/1984 | Illy .................... A47J 31/3647 |
| | | 222/54 |
| 4,651,632 A | 3/1987 | Motsch |
| 4,728,005 A | 3/1988 | Jacobs et al. |
| 4,969,392 A | 11/1990 | Steele et al. |
| 5,115,730 A | 5/1992 | Gockelmann |
| 5,168,794 A * | 12/1992 | Glucksman ........... A47J 31/103 |
| | | 99/295 |
| 5,230,278 A | 7/1993 | Bunn et al. |
| D346,298 S | 4/1994 | Brady et al. |
| 5,325,765 A | 7/1994 | Sylvan et al. |
| 5,372,061 A * | 12/1994 | Albert .................... A47J 31/46 |
| | | 99/281 |
| 5,388,501 A | 2/1995 | Hazan et al. |
| D356,712 S | 3/1995 | Brady |
| 5,503,060 A | 4/1996 | Morecroft et al. |
| D371,270 S | 7/1996 | Bell et al. |
| D373,281 S | 9/1996 | Simmons |
| 5,611,262 A | 3/1997 | Rizzuto et al. |
| D378,970 S | 4/1997 | Brady et al. |
| D379,132 S | 5/1997 | Brady et al. |
| 5,840,189 A | 11/1998 | Sylvan et al. |
| 5,865,095 A | 2/1999 | Mulle |
| D408,679 S | 4/1999 | Potts et al. |
| 5,992,026 A | 11/1999 | Hlava |
| 6,009,793 A | 1/2000 | Blankenship et al. |
| 6,079,315 A | 6/2000 | Beaulieu et al. |
| 6,095,031 A | 8/2000 | Warne |
| D432,848 S | 10/2000 | Brady et al. |
| D432,849 S | 10/2000 | Brady et al. |
| 6,142,063 A | 11/2000 | Beaulieu et al. |
| 6,148,717 A | 11/2000 | Lassota |
| 6,182,554 B1 | 2/2001 | Beaulieu et al. |
| D439,103 S | 3/2001 | Cruz |
| D442,012 S | 5/2001 | Haring et al. |
| D446,080 S | 8/2001 | Cruz |
| D446,989 S | 8/2001 | Cruz |
| 6,283,013 B1 | 9/2001 | Romandy et al. |
| D453,656 S | 2/2002 | Byler et al. |
| D457,375 S | 5/2002 | Picozza et al. |
| 6,440,256 B1 | 8/2002 | Gordon et al. |
| D462,226 S | 9/2002 | Williamson et al. |
| D462,865 S | 9/2002 | Honan et al. |
| 6,557,584 B1 | 5/2003 | Lucas et al. |
| 6,564,975 B1 | 5/2003 | Garman |
| 6,565,906 B1 | 5/2003 | Lassota |
| 6,571,686 B1 | 6/2003 | Riley et al. |
| 6,576,282 B1 | 6/2003 | Lassota |
| D477,175 S | 7/2003 | Smith |
| 6,586,710 B2 | 7/2003 | Williamson |
| D478,242 S | 8/2003 | Garman |
| 6,606,938 B2 | 8/2003 | Taylor |
| 6,644,173 B2 | 11/2003 | Lazaris et al. |
| 6,655,260 B2 | 12/2003 | Lazaris et al. |
| 6,658,989 B2 | 12/2003 | Sweeney |
| 6,666,130 B2 | 12/2003 | Taylor |
| 6,672,200 B2 | 1/2004 | Duffy et al. |
| 6,681,960 B2 | 1/2004 | Garman |
| 6,708,600 B2 | 3/2004 | Winkler et al. |
| D489,215 S | 5/2004 | Honan et al. |
| 6,752,069 B1 | 6/2004 | Burke et al. |
| 6,827,004 B2 | 12/2004 | Hammad et al. |
| D513,572 S | 1/2006 | Schaffeld et al. |
| D514,865 S | 2/2006 | Steiner |
| D514,866 S | 2/2006 | Brady |
| D514,867 S | 2/2006 | Steiner |
| 7,013,795 B2 | 3/2006 | Mulle et al. |
| D526,523 S | 8/2006 | Steiner et al. |
| D531,855 S | 11/2006 | Steiner et al. |
| 7,131,369 B2 | 11/2006 | Gantt et al. |
| 7,165,488 B2 | 1/2007 | Bragg et al. |
| D543,770 S | 6/2007 | Ye |
| D544,299 S | 6/2007 | Schaffeld et al. |
| D549,520 S | 8/2007 | Brady et al. |
| 7,279,190 B1 | 10/2007 | Lassota et al. |
| D556,495 S | 12/2007 | Davenport |
| D558,506 S | 1/2008 | Garman |
| 7,337,704 B2 | 3/2008 | Hammad et al. |
| 7,347,138 B2 | 3/2008 | Bragg et al. |
| 7,360,418 B2 | 4/2008 | Pelovitz |
| 7,377,162 B2 | 5/2008 | Lazaris |
| D570,149 S | 6/2008 | Truong |
| D572,965 S | 7/2008 | Steiner |
| 7,398,726 B2 | 7/2008 | Streeter et al. |
| D575,977 S | 9/2008 | Rose |
| D582,714 S | 12/2008 | Hensel |
| 7,461,586 B2 | 12/2008 | Garman et al. |
| 7,503,253 B2 | 3/2009 | Rahn |
| 7,513,192 B2 | 4/2009 | Sullivan et al. |
| 7,523,695 B2 | 4/2009 | Streeter et al. |
| D593,354 S | 6/2009 | Romandy |
| D593,356 S | 6/2009 | Grassia |
| 7,540,232 B2 | 6/2009 | Bates et al. |
| 7,543,528 B2 | 6/2009 | Garman |
| D597,368 S | 8/2009 | Steiner |
| D600,493 S | 9/2009 | Pino et al. |
| D602,301 S | 10/2009 | Romandy |
| 7,637,204 B2 | 12/2009 | Sumser et al. |
| 7,640,845 B2 | 1/2010 | Woodnorth et al. |
| 7,640,846 B2 | 1/2010 | Williamson et al. |
| 7,644,653 B2 | 1/2010 | Bates |
| 7,677,157 B2 | 3/2010 | Steiner et al. |
| 7,677,158 B2 | 3/2010 | McDuffie et al. |
| 7,730,829 B2 | 6/2010 | Hammad |
| D619,409 S | 7/2010 | Pino et al. |
| D619,410 S | 7/2010 | Pino et al. |
| D620,302 S | 7/2010 | Picozza et al. |
| D622,999 S | 9/2010 | Murauyou et al. |
| D623,000 S | 9/2010 | Murauyou et al. |
| D625,542 S | 10/2010 | Picozza et al. |
| D627,186 S | 11/2010 | Romandy |
| 7,836,820 B2 | 11/2010 | Hammad |
| D634,962 S | 3/2011 | Butler |
| D634,963 S | 3/2011 | Romandy |
| D637,484 S | 5/2011 | Winkler |
| 7,997,187 B2 | 8/2011 | Garman et al. |
| D647,398 S | 10/2011 | Winkler |
| D647,399 S | 10/2011 | Winkler |
| D649,826 S | 12/2011 | Garman |
| 8,075,935 B2 | 12/2011 | Kreutzer et al. |
| D654,755 S | 2/2012 | Gresko |
| 8,151,694 B2 | 4/2012 | Jacobs et al. |
| D660,072 S | 5/2012 | Makhanlall et al. |
| 8,201,491 B2 | 6/2012 | Garman |
| D662,756 S | 7/2012 | Steiner et al. |
| 8,225,708 B2 | 7/2012 | Lassota et al. |
| D670,539 S | 11/2012 | Starr et al. |
| D670,540 S | 11/2012 | Starr et al. |
| 8,327,753 B2 | 12/2012 | White et al. |
| 8,361,527 B2 | 1/2013 | Winkler et al. |
| D675,867 S | 2/2013 | Starr et al. |
| 8,393,975 B2 | 3/2013 | Widanagamage et al. |
| 8,438,968 B2 | 5/2013 | Warner |
| D685,600 S | 7/2013 | White |
| D686,033 S | 7/2013 | Burton et al. |
| 8,495,949 B2 | 7/2013 | Tinkler et al. |
| 8,495,950 B2 | 7/2013 | Fedele et al. |
| 8,516,948 B2 | 8/2013 | Zimmerman et al. |
| 8,573,114 B2 | 11/2013 | Huang et al. |
| 8,573,115 B2 | 11/2013 | Lai et al. |
| 8,590,445 B2 | 11/2013 | Garman |
| 8,609,170 B2 | 12/2013 | Tinkler et al. |
| 8,635,946 B2 | 1/2014 | White et al. |
| 8,646,379 B2 | 2/2014 | Lai et al. |
| 8,667,892 B2 | 3/2014 | Cominelli et al. |
| 8,770,094 B2 | 7/2014 | Rithener et al. |
| 8,800,431 B2 | 8/2014 | Sullivan et al. |
| D713,668 S | 9/2014 | Metaxatos et al. |

(56) References Cited

U.S. PATENT DOCUMENTS

| | | | |
|---|---|---|---|
| 8,863,987 B2 | 10/2014 | Jacobs et al. | |
| 8,877,276 B2 | 11/2014 | Cominelli et al. | |
| 2003/0080107 A1 | 5/2003 | Williamson | |
| 2003/0167928 A1 | 9/2003 | Mulle et al. | |
| 2003/0188801 A1 | 10/2003 | Garman | |
| 2004/0118299 A1 | 6/2004 | Garman et al. | |
| 2004/0244598 A1 | 12/2004 | Garman | |
| 2005/0051478 A1 | 3/2005 | Karanikos et al. | |
| 2005/0160917 A1 | 7/2005 | Gantt et al. | |
| 2006/0037481 A1 | 2/2006 | Bicht | |
| 2006/0112832 A1 | 6/2006 | Barraclough et al. | |
| 2006/0174773 A1 | 8/2006 | Taylor | |
| 2006/0180029 A1 | 8/2006 | Bates | |
| 2006/0180030 A1 | 8/2006 | Bates et al. | |
| 2006/0196365 A1 | 9/2006 | Garman | |
| 2006/0278091 A1 | 12/2006 | Rutigliano | |
| 2006/0292012 A1 | 12/2006 | Brudevold et al. | |
| 2007/0056994 A1 | 3/2007 | Woodnorth et al. | |
| 2007/0119308 A1 | 5/2007 | Glucksman et al. | |
| 2007/0157820 A1 | 7/2007 | Bunn | |
| 2008/0134900 A1 | 6/2008 | Steiner et al. | |
| 2008/0134902 A1 | 6/2008 | Zimmerman et al. | |
| 2008/0216663 A1 | 9/2008 | Williamson | |
| 2008/0216667 A1 | 9/2008 | Garman et al. | |
| 2009/0031900 A1 | 2/2009 | Barraclough et al. | |
| 2009/0031902 A1 | 2/2009 | Star et al. | |
| 2010/0011964 A1 | 1/2010 | White et al. | |
| 2010/0024658 A1 | 2/2010 | Jacobs et al. | |
| 2010/0206175 A1 | 8/2010 | White et al. | |
| 2010/0266740 A1 | 10/2010 | Van Den Aker et al. | |
| 2010/0269703 A1 | 10/2010 | Lin | |
| 2010/0270284 A1 | 10/2010 | Cohen et al. | |
| 2010/0288777 A1 | 11/2010 | White et al. | |
| 2010/0303964 A1 | 12/2010 | Beaulieu et al. | |
| 2011/0076361 A1 | 3/2011 | Peterson et al. | |
| 2011/0189362 A1 | 8/2011 | Denisart et al. | |
| 2011/0212231 A1 | 9/2011 | McLaughlin | |
| 2011/0223302 A1 | 9/2011 | Star et al. | |
| 2011/0284574 A1 | 11/2011 | Garman | |
| 2012/0017765 A1 | 1/2012 | Leung et al. | |
| 2012/0052171 A1 | 3/2012 | Starr et al. | |
| 2012/0121764 A1 | 5/2012 | Lai et al. | |
| 2012/0121768 A1 | 5/2012 | Lai et al. | |
| 2012/0121779 A1 | 5/2012 | Lai et al. | |
| 2012/0121780 A1 | 5/2012 | Lai et al. | |
| 2012/0171332 A1 | 7/2012 | Lai et al. | |
| 2012/0199008 A1 | 8/2012 | White et al. | |
| 2013/0019903 A1 | 1/2013 | Rizzuto et al. | |
| 2013/0068012 A1 | 3/2013 | Preston et al. | |
| 2013/0087049 A1 | 4/2013 | White et al. | |
| 2013/0101716 A1 | 4/2013 | Beaulieu et al. | |
| 2013/0122167 A1 | 5/2013 | Winkler et al. | |
| 2013/0129876 A1 | 5/2013 | Ye et al. | |
| 2013/0133524 A1* | 5/2013 | Vastardis | A47J 31/4403 99/300 |
| 2013/0209636 A1 | 8/2013 | Cominelli et al. | |
| 2013/0233950 A1 | 9/2013 | Sandford et al. | |
| 2013/0239817 A1 | 9/2013 | Starrr et al. | |
| 2013/0319034 A1 | 12/2013 | Kounlavong et al. | |
| 2013/0337132 A1 | 12/2013 | Fenna et al. | |
| 2013/0344205 A1 | 12/2013 | Oh | |
| 2014/0010934 A1 | 1/2014 | Garman | |
| 2014/0030404 A1 | 1/2014 | Sullivan et al. | |
| 2014/0037808 A1 | 2/2014 | Rizzuto et al. | |
| 2014/0057033 A1 | 2/2014 | Lai et al. | |
| 2014/0069279 A1 | 3/2014 | Upston et al. | |
| 2014/0072689 A1 | 3/2014 | Ho et al. | |
| 2014/0079853 A1* | 3/2014 | Hansen | A47J 31/3623 426/425 |
| 2014/0102306 A1 | 4/2014 | White et al. | |
| 2014/0109667 A1 | 4/2014 | White et al. | |
| 2014/0141142 A1 | 5/2014 | Cominelli et al. | |
| 2014/0208952 A1 | 7/2014 | Starr et al. | |
| 2014/0208954 A1 | 7/2014 | Starr et al. | |
| 2014/0242226 A1 | 8/2014 | Buttiker | |
| 2014/0251151 A1 | 9/2014 | Cao et al. | |
| 2014/0261000 A1 | 9/2014 | Weflen | |
| 2014/0261853 A1 | 9/2014 | Carnevale et al. | |
| 2014/0263397 A1 | 9/2014 | Jacobs | |
| 2014/0263398 A1 | 9/2014 | Swerchesky et al. | |
| 2014/0263432 A1 | 9/2014 | Jacobs et al. | |
| 2014/0272023 A1 | 9/2014 | Zimmerman et al. | |
| 2014/0272048 A1 | 9/2014 | Hristov et al. | |
| 2014/0272076 A1 | 9/2014 | Nevin et al. | |
| 2014/0302210 A1 | 10/2014 | Garman | |
| 2014/0314926 A1 | 10/2014 | Hanes et al. | |
| 2014/0318378 A1 | 10/2014 | Ertur et al. | |
| 2015/0017297 A1* | 1/2015 | Vastardis | A47J 31/002 426/429 |
| 2015/0064324 A1* | 3/2015 | Oh | B65D 85/8043 426/433 |
| 2015/0282662 A1 | 10/2015 | Levine et al. | |
| 2015/0359374 A1 | 12/2015 | Anthony et al. | |
| 2015/0359378 A1 | 12/2015 | Anthony et al. | |
| 2015/0359381 A1 | 12/2015 | Anthony et al. | |
| 2016/0058233 A1 | 3/2016 | Anthony et al. | |
| 2017/0172340 A1* | 6/2017 | Baarman | A47J 31/52 |

FOREIGN PATENT DOCUMENTS

| | | |
|---|---|---|
| JP | 2006014922 A | 1/2006 |
| WO | 2011140582 A2 | 11/2011 |
| WO | 2012093269 A2 | 7/2012 |

OTHER PUBLICATIONS

"What is Coffee Bloom?"; http://cupandbrew.com/blogs/cupandbrew-blog/12135009-what-is-coffee-bloom; Sep. 8, 2014.

Behmor Inc.; The BraZen Coffee Brewer introduces a revolutionary new vision in coffee brewing—where the user is actually in control of the brewing process; www.behmor.com; published Apr. 17, 2012.

Brazen Plus 8-Cup Programmable Coffee Maker by Behmor Inc.; Operations and Maintenance Guide; www.behmor.com; published Jul. 11, 2014.

Breville the YouBrew Instruction Book, Model BDC600XL/A, published Mar. 30, 2012.

Email dated Sep. 18, 2014; Subject: FW: Brazen Plus Coffee Maker Pre-Soak Time; from Josh Anthony to Blaine Page.

Geiger, Brian, contributor, fine Cooking, "Making Automatic Drip Coffee Better by Blooming," Mar. 7, 2011.

International Search Report; International Application No. PCT/US2015/035785; International Filing Date: Jun. 15, 2015; dated Dec. 3, 2015; 8 Pages.

International Search Report; International Application No. PCT/US2015/051507; International Filing Date: Sep. 22, 2015; dated Mar. 9, 2016; 8 Pages.

Ratio Coffee Machine; http://www.clivecoffee.com/product/ratio-coffee-machine.html; Aug. 18, 2014.

Written Opinion of the International Searching Authority; International Application No. PCT/US2015/035785; International Filing Date: Jun. 15, 2015; dated Dec. 3, 2015; 8 Pages.

Written Opinion of the International Searching Authority; International Application No. PCT/US2015/051507; International Filing Date: Sep. 22, 2015; dated Mar. 9, 2016; 8 Pages.

European Office Action; dated Jul. 11, 2019; European Application No. 15731459.1; filed Jun. 15, 2015; 5 pages.

European Office Action; dated Jul. 29, 2019; European Application No. 15778447.1; filed Sep. 22, 2015; 6 pages.

Wikipedia, "Coffeemaker," Wikipedia.org; URL: https://en.wikipedia.org/wiki/coffeemaker; Retrieved Aug. 15, 2019; 7 pages.

Wikipedia, "User interface," Wikipedia.org; URL: https://en.wikipedia.org/wiki/User_interface; Retrieved2 Aug. 12, 2019; 11 pages.

* cited by examiner

AUTOMATIC COFFEE MAKER

CROSS-REFERENCE TO RELATED APPLICATION

This application is a divisional of U.S. patent application Ser. No. 14/307,289 filed Jun. 17, 2014, now U.S. Pat. No. 10,028,615 the entire contents of which are incorporated herein by reference.

BACKGROUND

1. Technical Field

Aspects and embodiments of the present disclosure relate to systems and methods for brewing beverages, including coffee.

2. Discussion of Related Art

Various systems and methods for brewing coffee are known. Known systems include, for example, drip brewing systems in which hot water is passed from above through coffee grounds retained in a filter and into a carafe and French press systems in which coffee grounds and hot water are mixed in a container and a water permeable plunger is pressed into the container from above to trap the ground coffee beans at the bottom of the container and provide for brewed coffee to be extracted from above the plunger.

SUMMARY

In accordance with one aspect, there is provided a coffee brewing machine. The coffee brewing machine comprises a reservoir configured to contain water and a brew chamber in fluid communication with the reservoir. The brew chamber is configured to receive ground coffee and to brew the ground coffee when hot water is introduced into the brew chamber. The coffee brewing machine further comprises a dispenser in fluid communication with the brew chamber. The dispenser is configured to dispense brewed coffee into a container.

In accordance with another aspect, there is provided a method of brewing coffee with an automatic coffee maker. The method comprises determining a quantity of water sufficient to complete a brewing cycle, delivering a predetermined amount of water from a reservoir containing the quantity of water to a heater, the predetermined amount of water being less than the quantity of water, heating the predetermined amount of water with the heater to form a predetermined amount of heated water, delivering the predetermined amount of heated water from the heater to a brew basket containing ground coffee, and soaking the ground coffee with the predetermined amount of heated water for a predetermined period of time to enable heated water delivered to the brew basket to presoak the ground coffee contained in brew basket prior to completing the brewing cycle.

In some embodiments, the method further comprises, after the predetermined period of time, delivering a remaining amount of water from the quantity of water from the reservoir to the heater, heating the remaining amount of water with the heater to produce a remaining amount of heated water, and delivering the remaining amount of heated water from the heater to the brew basket to complete the brew cycle.

In some embodiments, the predetermined amount of water and the predetermined period of time are dependent on a size of a container used to receive brewed coffee produced in the brewing cycle of the automatic coffee maker. The container may be one of a carafe, a one-half carafe, a travel mug, and a mug. The predetermined amount of water may be one of between about 160 ml and about 240 ml for the carafe, between about 80 ml and about 120 ml for the one-half carafe, between about 40 ml and about 60 ml for the travel mug, and between about 27 ml and about 41 ml for the mug. A sum of the predetermined amount of water and the remaining amount of water may be one of between about 1,064 ml and about 1,360 ml for the carafe, between about 710 ml and about 964 ml for the one-half carafe, between about 355 ml and about 473 ml for the travel mug, and between about 177 ml and about 296 ml for the mug. In some embodiments, the predetermined amount of time is at least about 15 seconds.

In some embodiments, the method further comprises using a flow meter in the automatic coffee maker to measure the predetermined amount of water.

In some embodiments, the method further comprises using a controller in the automatic coffee maker to control the brew cycle, the controller configured to control the heater responsive to receipt of a signal from the flow meter representative of a quantity of water flowed through the flow meter.

In accordance with another aspect, there is provided an automatic coffee maker. The automatic coffee machine comprises a reservoir configured to hold a quantity of water sufficient to complete a brew cycle, a heater in fluid communication with the reservoir, the heater being configured to heat water delivered from the reservoir to the heater, a brew basket in fluid communication with the heater, the brew basket being configured to hold ground coffee and to receive heated water from the heater, a flow meter disposed between the reservoir and the brew basket, and a controller coupled to the heater and the flow meter, the controller being configured to control delivery of a predetermined amount of water from the reservoir to the heater and from the heater to the brew basket at a beginning of the brew cycle to presoak the coffee grounds contained in the brew basket with heated water for a predetermined amount of time prior to delivering a remaining amount of water from the quantity of water to the brew basket to complete the brewing cycle, the predetermined amount of water being less than the quantity of water.

In some embodiments, the controller is further configured to, after the predetermined period of time, control delivery of the remaining amount of water from the quantity of water in the reservoir to the heater, heating the remaining amount of water with the heater to form a remaining amount of heated water, and delivering the remaining amount of heated water from the heater to the brew basket to complete the brew cycle.

In some embodiments, the predetermined amount of water is measured by the flow meter. The flow meter may be positioned in a flow path between the reservoir and the heater.

In some embodiments, the automatic coffee maker further comprises a user interface coupled to the controller and configured to receive indication of a size of a container used with the coffee maker, and wherein the controller is configured to determine the predetermined amount of water and the predetermined amount of time based on the size of the container.

In some embodiments, the container is one of a carafe, a one-half carafe, a travel mug, and a mug. The predetermined amount of water may be one of between about 160 ml and about 240 ml for the carafe, between about 80 ml and about 120 ml for the one-half carafe, between about 40 ml and about 60 ml for the travel mug, and between about 27 ml and about 41 ml for the mug. A sum of the predetermined amount of water and the remaining amount of water may be one of between about 1,064 ml and about 1,360 ml for the carafe, between about 710 ml and about 964 ml for the one-half carafe, between about 355 ml and about 473 ml for the travel mug, and between about 177 ml and about 296 ml for the mug. In some embodiments, the predetermined amount of time is at least about 15 seconds.

In accordance with another aspect, there is provided an automatic coffee maker. The automatic coffee machine comprises a reservoir configured to hold a quantity of water required to complete a brew cycle, a heater in fluid communication with the reservoir, the heater being configured to heat water delivered from the reservoir to the heater, a brew basket in fluid communication with the heater, the brew basket being configured to hold ground coffee and to receive heated water from the heater, and means for controlling delivery of a predetermined amount of water from the reservoir to the heater and from the heater to the brew basket at a beginning of the brew cycle to presoak the coffee grounds contained in the brew basket with heated water for a predetermined amount of time prior to delivering a remaining amount of water from the quantity of water to the brew basket to complete the brewing cycle, the predetermined amount of water being less than the quantity of water.

In some embodiments, the automatic coffee maker further comprises means for controlling, after the predetermined amount of time, delivery of the remaining amount of water from the quantity of water in the reservoir to the heater, heating the remaining amount of water with the heater to form a remaining amount of heated water, and delivering the remaining amount of heated water from the heater to the brew basket to complete the brew cycle.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
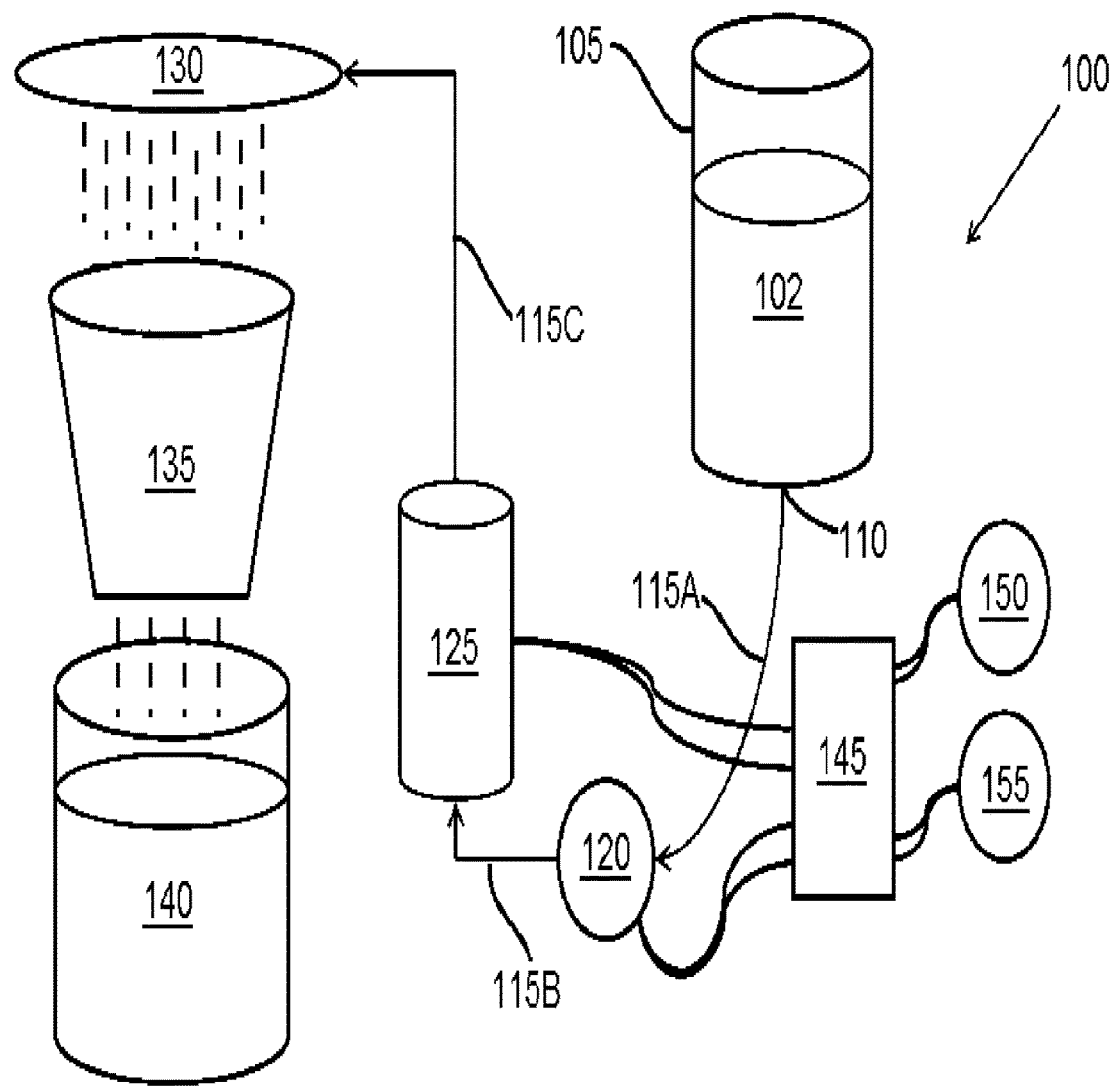
FIG. 1 is a schematic diagram of components of an embodiment of a coffee machine.

Aspects and embodiments disclosed herein are not limited to the details of construction and the arrangement of components set forth in the following description or illustrated in the drawings. The disclosed aspect and embodiments are capable of being practiced or of being carried out in various ways. The phraseology and terminology used herein is for the purpose of description and should not be regarded as limiting. The use of "including," "comprising," "having," "containing," "involving," and variations thereof herein is meant to encompass the items listed thereafter and equivalents thereof.

Aspects and embodiments disclosed herein include systems and methods for brewing coffee. As the term is used herein, "coffee" refers to a beverage including solids extracted from coffee beans and dissolved in water. Brewed coffee typically includes from about 0.8% to about 1.5% by weight of dissolved solids in water, with American standards being between about 0.8% to about 1.35%, Norwegian standards being between about 1.3% to about 1.5%, and European standards being between about 1.2% to about 1.45%. These dissolved solids ranges are merely exemplary, and it should be understood that brewed coffee may include amounts of dissolved solids outside of these ranges. Further, it should be understood that although aspects and embodiments disclosed herein are described as apparatus for brewing coffee, it should be understood that these aspects and embodiments may also or alternatively be utilized for the preparation or brewing of other beverages, for example, tea, hot chocolate, or any other hot or cold prepared beverage.

Brewed coffee is typically prepared by passing hot water through dried and ground coffee beans, referred to herein as "ground coffee." Solids from the ground coffee are dissolved in the hot water as it passes through the ground coffee. The solubles yield of brewed coffee—the percentage by weight of the ground coffee which is dissolved in the water—is generally consider to desirably be between about 18% and about 22%, for example, about 20% for hot coffee. Hot coffee with a solubles yield of less than 18% is often considered under-extracted and more sour than desirable. This is because sour tasting acids are more readily extracted from ground coffee than balancing lipids and bitterness compounds. Hot coffee with a solubles yield of more than 22% is often considered over-extracted and bitter. This is because bitterness compounds continue to be extracted from ground coffee after acids and lipids have largely completed extraction. Iced coffee may have a desired soluble yield less than that of hot coffee, for example, between about 16% and about 20%.

The solubles yield of brewed coffee is determined by factors including the temperature of the water passed through the ground coffee, the grind size of the ground coffee, and the time for which the water is in contact with the ground coffee. For example, ground coffee with a larger grind size may require a higher water temperature or a longer water contact time at a lower water temperature to achieve the same or an equivalent amount of solubles extraction as ground coffee with a smaller grind size.

An amount of water used to brew coffee should be controlled to produce coffee with a pleasant flavor and strength. The use of too much water may result in coffee that is weak (containing an undesirably low solubles concentration). The use of too little water may result in coffee which is undesirably strong (containing an undesirably high solubles concentration). One liter of water delivered to between about 50 grams and about 60 grams of ground coffee may be used to produce pleasantly flavored coffee with a pleasing strength.

The temperature of the water used for brewing coffee is often considered an important variable in determining proper balance and taste in brewed coffee. A generally accepted desirable temperature for the water used for brewing coffee is between about 195° F. and about 205° F. (91-96° C.). Cooler water may not extract a desirable quantity of solubles that make up the flavor of brewed coffee. Hotter water may extract a higher ratio of bitter solubles than sugars and other flavor providing solubles than desirable.

A proper balance between grind size, water contact time, water temperature, and ratio of water to amount of ground coffee is desirable to produce coffee with a pleasant flavor and strength. An apparatus for brewing coffee (referred to herein as a "coffee machine," "coffee maker," or "coffee brewing machine") capable of producing pleasantly flavored and balanced coffee desirably is capable of controlling the quantity of the water used to brew the coffee and the time for which the water is in contact with the ground coffee.

It has been discovered that pre-soaking of ground coffee with water in, for example, a brew basket of a coffee machine prior to delivering the majority of the hot water used to brew the coffee to the brew basket may result in brewed coffee having a more pleasant taste than brewed coffee produced in the absence of pre-soaking the ground coffee. The water used for pre-soaking the ground coffee may be referred to herein as "bloom water" and the amount of time the bloom water is exposed to the ground coffee to presoak the ground coffee is "bloom time." The water used to brew the coffee from the ground coffee in addition to the bloom water will be referred to herein as "brew water." The brew water is delivered to the ground coffee after completion of presoaking of the ground coffee with the bloom water for the bloom time. It has been discovered that a ratio of an amount of bloom water to an amount of brew water, in addition to other factors, for example, a total volume of water used to brew coffee from a given volume and/or mass of ground coffee and the temperature of the water used to brew the coffee should be controlled to produce well balanced and pleasantly tasting coffee.

A schematic diagram of an embodiment of a coffee machine used in accordance with embodiments of the present disclosure is illustrated in FIG. 1. The coffee machine 100 includes a water reservoir 105 for holding water 102 to be used for brewing coffee. The water reservoir 105 includes lower outlet 110. A conduit 115A, which may include food safe tubing, for example, food grade silicone tubing, is attached to the lower outlet 110 of the water reservoir 105. The conduit 115A fluidicly connects the lower outlet 110 of the water reservoir to a flow meter 120. A second conduit 115 B, which may be food safe and may include a metal conduit, for example, stainless steel tubing and/or polymeric tubing, for example, food grade silicone tubing, fluidicly connects the flow meter to a heater/boiler 125. The conduit 115B may be rated to operate at elevated temperatures, for example, at temperatures up to about 150° C.

The heater/boiler 125 is fluidicly connected through a third conduit 115C, which may be made of similar or different materials than conduit 115B, to a showerhead 130 of the coffeemaker 100. The showerhead 130 is configured to distribute water onto ground coffee disposed in a brew chamber 135. The brew chamber 135 is configured to receive ground coffee and to brew the ground coffee when hot water is introduced into the brew chamber 135 and to direct brewed coffee, either directly, or through one or more conduits or chambers, into a container 140, for example, a carafe, half-carafe, travel mug, or mug. The brew chamber 135 may be configured to support a coffee filter in which the ground coffee may be disposed. In some embodiments, the showerhead 130 may be disposed above or within an orifice defined in a lid of the brew chamber 135.

Operation of the coffee machine 100 is controlled by a controller 145, which may include any one or more of a microprocessor, microcontroller, application specific integrated circuit (ASIC), or any other form of electronic controller known in the art. The controller 145 may receive input from a user from controls, for example, a brew size selection control 150 and/or a temperature control 155 (used to select between hot and iced coffee) and/or any other control which may be included in various embodiments of the coffee machine 100. The controller 145 may be configured to receive a signal from the flow meter 120 and utilize the signal to calculate an amount of water flowing through the flow meter, and may control the heater/boiler 125 to produce coffee having a volume and/or strength specified by a user. The controller 145 may control operation of the heater/boiler 125 responsive to an amount of water flowed through the flow meter 120. In some embodiments, the heater/boiler 125 is an electrical heater which is operable under control of the controller 145 of the coffee machine.

Figure 2:
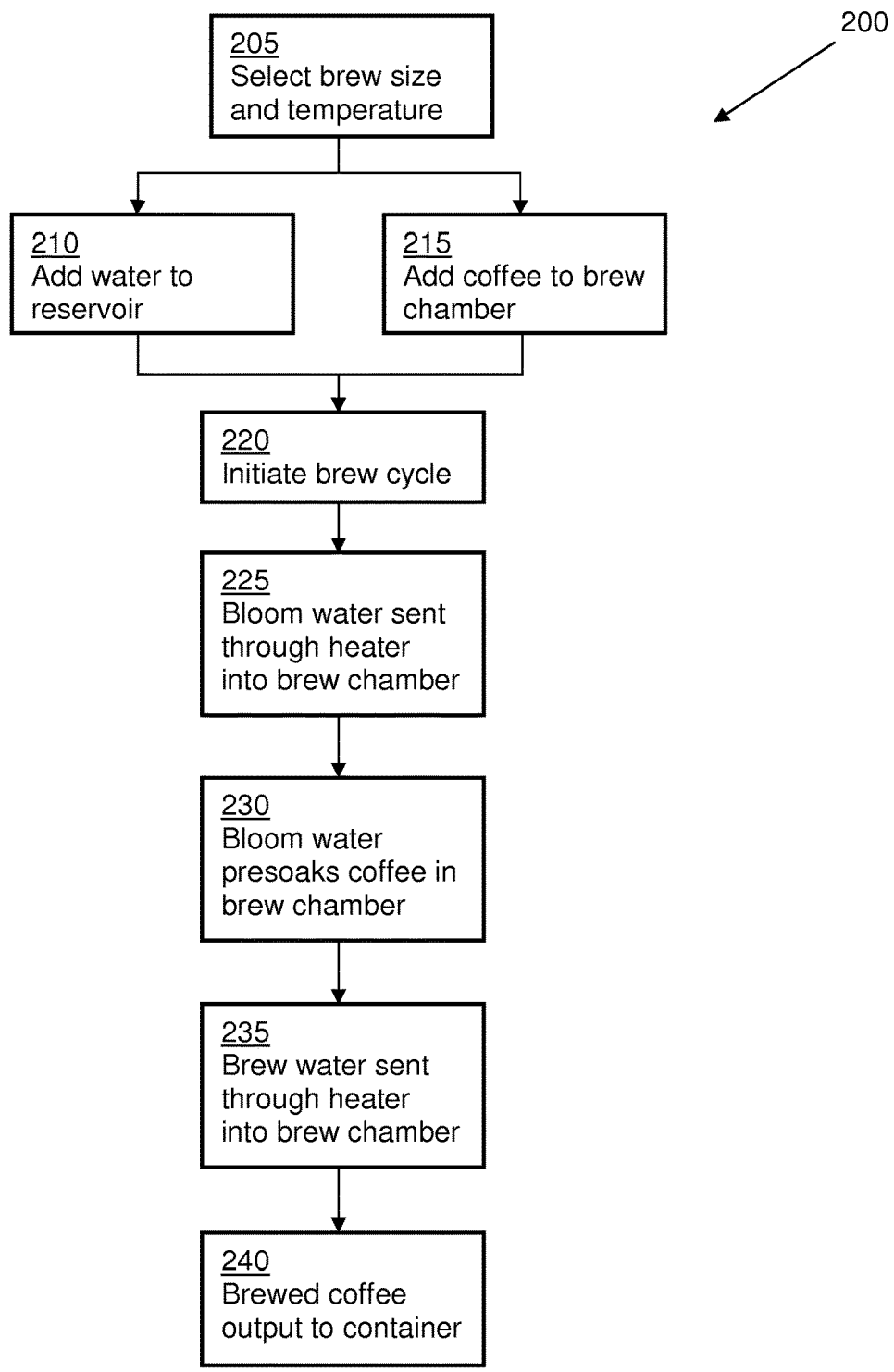
FIG. 2 is a flowchart of an embodiment of a method of brewing coffee.

A method of brewing coffee is illustrated in the flowchart of FIG. 2, indicated generally at 200. In operation, a user selects a brew size and temperature of coffee (i.e., hot or iced) to be brewed by the coffee machine 100, for example, using the controls 150 and/or 155 (act 205). The brew size may be selected from, for example, a carafe (between about 36 ounces (1,064 milliliters) and about 46 ounces (1,360 milliliters)), a half-carafe (between about 24 ounces (710 milliliters) and about 32 ounces (946 milliliters)), a travel mug (between about 12 ounces (355 milliliters) and about 16 ounces (473 milliliters)) and a mug (between about six ounces (177 milliliters) and about 10 ounces (296 milliliters)). The user adds a sufficient amount of water to the reservoir 105 to brew the desired amount of coffee (act 210). The user may also add ground coffee to the brew chamber 135 in an amount appropriate for the selected brew size (act 215). The brew chamber 135, in some embodiments, includes score marks or other indicators to assist the user in adding an appropriate amount of ground coffee to the brew chamber 135. In some embodiments, a permanent coffee filter for use in the brew chamber 135 may include score marks or other indicators to assist the user in adding an appropriate amount of ground coffee to the permanent coffee filter. In other embodiments, the coffee machine 100 may be configured to automatically add water and/or ground coffee to the reservoir 105 and/or brew chamber 135 from sources of water and ground coffee.

After an appropriate amount of water and ground coffee has been added to the coffee machine 100, the user presses a start key or button (not shown) and the coffee machine begins brewing the coffee (act 220). Alternatively, the coffee machine 100 may automatically begin brewing coffee in response to a signal from a timer or other programming device. Water is directed from the reservoir 105, through the flow meter 120, and into the heater/boiler 125. In the heater/boiler 125, the water is heated to a desired temperature. The heated water and/or steam generated in the heater/boiler 125 builds up pressure in the heater/boiler 125 and a first portion of the water, used as the bloom water, escapes through conduit 115C into the showerhead 130 and is distributed onto ground coffee in the brew chamber 135 (act 225). The bloom water is provided in a predetermined amount dependent on the selected brew size.

The heater/boiler 125 is controlled by the controller 145 to heat water for only an amount of time sufficient to deliver a predetermined volume of bloom water, as measured by the flow meter 120, into the brew chamber 135. In some embodiments, the amount of bloom water delivered to the brew chamber is sufficient to moisten a portion or all of the ground coffee in the brew chamber, but insufficient to cause a significant amount of, or any, water to exit the brew chamber into the container 140.

The bloom water presoaks the ground coffee for a predetermined period of time (act 230). After allowing the bloom water to presoak the ground coffee for the bloom time, the controller 145 turns the heater/boiler 125 back on to heat and direct the remaining volume of water, as measured by the flow meter 120, to be used to brew the amount of coffee desired by the user (the brew water) to the brew chamber 135 (act 235). The heated brew water enters the brew chamber 135 to produce coffee which is directed from the brew chamber 135 into the container 140, completing the brew cycle (act 240).

In some embodiments, recipes for brewing various amounts of hot and iced brewed coffee may include delivering the amounts of bloom water and brew water to the amounts of ground coffee as shown in Tables 1 and 2, respectively, below. The amounts of coffee, water, and bloom time may be adjusted from the values shown in Tables 1 and 2 based on user tastes or preferences or depending on a model of coffee machine being used. For example, the amounts of ground coffee, bloom water, and/or brew water may be varied by about +/−20% from the values indicated in the tables below. In some models of coffee machines the amount of bloom water used may be between about 50% and about 200% of the amounts indicated in the tables below. An adjustment to an amount of bloom water used may be accompanied by a corresponding opposite adjustment in an amount of brew water used to maintain a predetermined total amount of water delivered to the ground coffee which is appropriate for a particular type of container being used. The bloom time may be varied from about 15 seconds to about 90 seconds. The bloom time for the bloom water is indicated in the "Bloom Rest Duration" column in Tables 1 and 2.

TABLE 1

Examples of Hot Coffee Recipe Parameters

| Brew Size (ounces) | Ground Coffee (grams) | Bloom Water (milliliters) | Bloom Rest Duration (seconds) | Brew Water (milliliters) | Total Water Delivered (milliliters) |
|---|---|---|---|---|---|
| 9.5 | 17 | 34 | 30 | 290 | 324 |
| 14 | 25 | 50 | 45 | 402 | 452 |
| 28 | 50 | 100 | 30 | 803 | 903 |
| 38 | 68 | 200 | 30 | 1,055 | 1,255 |

TABLE 2

Examples of Iced Coffee Recipe Parameters

| Brew Size (ounces) | Ground Coffee (grams) | Bloom Water (milliliters) | Bloom Rest Duration (seconds) | Brew Water (milliliters) | Total Water Delivered (milliliters) |
|---|---|---|---|---|---|
| 14 | 25 | 50 | 60 | 190 | 240 |
| 38 | 68 | 200 | 30 | 425 | 625 |

For the iced coffee recipes, hot coffee may be brewed in accordance with the recipes indicated in Table 2, adjusted as desired based on a user's taste, and the hot brewed coffee may be delivered to a container partially filled with ice. The hot coffee will dissolve at least a portion of the ice in the container, cooling the coffee and diluting the coffee to a desirable strength.

The present disclosure is also directed to a computer readable medium, for example, a non-volatile computer readable medium such as an EEPROM, compact disc, DVD, flash drive, hard drive, or other computer readable medium. The computer readable medium includes computer readable instructions encoded thereon. The computer readable instructions may be executed by a controller of a coffee machine to perform a method of brewing coffee as disclosed above. In some embodiments, a coffee machine which was not previously capable of performing embodiments of a method of brewing coffee as disclosed herein may be upgraded by programming a controller of the coffee machine with the instructions on the computer readable medium.

Having thus described several aspects of at least one embodiment, it is to be appreciated various alterations, modifications, and improvements will readily occur to those skilled in the art. For example, it is to be appreciated that any of the features of any of the embodiments disclosed herein may be combined or substituted for features of any other embodiment disclosed herein. Acts of the method disclosed may be performed in alternate orders and one or more acts may be added to or omitted from the method or substituted by one or more alternative acts. Such alterations, modifications, and improvements are intended to be part of this disclosure, and are intended to be within the scope of the disclosure. Accordingly, the foregoing description and drawings are by way of example only.

What is claimed is:

1. An automatic coffee maker comprising:
an input for selecting one of a plurality of sizes of a container to be used with the coffee maker;
a reservoir configured to hold a quantity of water sufficient to complete a brew cycle;
a heater in fluid communication with the reservoir, the heater being configured to heat water delivered from the reservoir to the heater;
a brew basket in fluid communication with the heater, the brew basket being configured to hold ground coffee and to receive heated water from the heater;
a flow meter disposed between the reservoir and the brew basket; and
a controller coupled to the heater and the flow meter, the controller being configured to control delivery of a predetermined amount of water from the reservoir to the heater and from the heater to the brew basket at a beginning of the brew cycle to presoak the coffee grounds contained in the brew basket with heated water for a predetermined period of time prior to delivering a remaining amount of water from the quantity of water to the brew basket to complete the brewing cycle, the predetermined amount of water being less than the quantity of water, wherein the predetermined amount of water and the predetermined period of time are based on the selected size of the container, and the heater is energized during delivery of the predetermined amount of heated water to the brew basket and the heater is not energized during the predetermined period of time during which the coffee grounds are presoaked by the predetermined amount of water.

2. The automatic coffee maker of claim 1, wherein the controller is further configured to, after the predetermined period of time, control delivery of the remaining amount of water from the quantity of water in the reservoir to the heater, heating the remaining amount of water with the heater to form a remaining amount of heated water, and delivering the remaining amount of heated water from the heater to the brew basket to complete the brew cycle.

3. The automatic coffee maker of claim 2, wherein the predetermined amount of water is measured by the flow meter.

4. The automatic coffee maker of claim 3, wherein the flow meter is positioned in a flow path between the reservoir and the heater.

5. The automatic coffee maker of claim 4, further comprising a user interface coupled to the controller and including the at least one input for selecting the size of the container used with the coffee maker.

6. The automatic coffee maker of claim 5, wherein the container is one of a carafe, a half-sized carafe, a travel mug, and a mug.

7. The automatic coffee maker of claim 6, wherein the predetermined amount of water is one of between about 160 ml and about 240 ml for the carafe, between about 80 ml and about 120 ml for the half-sized carafe, between about 40 ml and about 60 ml for the travel mug, and between about 27 ml and about 41 ml for the mug.

8. The method of claim 7, wherein a sum of the predetermined amount of water and the remaining amount of water is one of between about 1,064 ml and about 1,360 ml for the carafe, between about 710 ml and about 964 ml for the half-sized carafe, between about 355 ml and about 473 ml for the travel mug, and between about 177 ml and about 296 ml for the mug.

9. The automatic coffee maker of claim 1, wherein the predetermined period of time is at least about 15 seconds.

\* \* \* \* \*